(12) United States Patent
Yatsu

(10) Patent No.: US 8,616,711 B2
(45) Date of Patent: Dec. 31, 2013

(54) OBLIQUE PROJECTOR HAVING MOVABLE FREE FORM LENSES

(75) Inventor: Masahiko Yatsu, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 283 days.

(21) Appl. No.: 13/083,669

(22) Filed: Apr. 11, 2011

(65) Prior Publication Data

US 2011/0299039 A1  Dec. 8, 2011

(30) Foreign Application Priority Data

Jun. 2, 2010 (JP) ................................ 2010-126436

(51) Int. Cl.
| | | |
|---|---|---|
| *G03B 21/14* | (2006.01) | |
| *G03B 21/20* | (2006.01) | |
| *G03B 21/26* | (2006.01) | |
| *G03B 3/00* | (2006.01) | |
| *G02B 3/00* | (2006.01) | |
| *G02B 9/00* | (2006.01) | |
| *G02B 15/14* | (2006.01) | |

(52) U.S. Cl.
USPC ............. 353/101; 353/94; 353/102; 359/649; 359/651; 359/676; 359/691; 359/692

(58) Field of Classification Search
USPC ................ 353/38, 94, 98, 100–101; 359/642, 359/649–651, 676, 691–692, 708, 713–717, 359/720, 726, 793, 795
See application file for complete search history.

(56) References Cited

U.S. PATENT DOCUMENTS

| | | | | |
|---|---|---|---|---|
| 5,709,445 | A  * | 1/1998  | Takamoto | ........................ 353/70 |
| 6,220,712 | B1 * | 4/2001  | Ohzawa | .......................... 353/70 |
| 7,239,452 | B2 * | 7/2007  | Kuwa | ............................. 359/649 |
| 7,467,872 | B2 * | 12/2008 | Hisada et al. | ................... 353/77 |
| 7,670,007 | B2 * | 3/2010  | Hisada et al. | ................... 353/70 |
| 7,766,487 | B2 * | 8/2010  | Hisada et al. | ................... 353/70 |
| 7,766,488 | B2 * | 8/2010  | Hirata et al. | .................... 353/70 |
| 7,850,313 | B2 * | 12/2010 | Hirata et al. | .................... 353/70 |
| 7,911,704 | B2 * | 3/2011  | Takaura et al. | ............... 359/649 |
| 7,914,153 | B2 * | 3/2011  | Hirata et al. | .................... 353/70 |
| 8,002,417 | B2 * | 8/2011  | Hisada et al. | ................... 353/70 |
| 8,002,418 | B2 * | 8/2011  | Hirata et al. | .................... 353/70 |

(Continued)

FOREIGN PATENT DOCUMENTS

| | | |
|---|---|---|
| JP | 2009-109867     | 5/2009 |
| JP | 2010-072374     | 4/2010 |
| JP | 2010072374 A  * | 4/2010 |

*Primary Examiner* — T. Ko
*Assistant Examiner* — Jori S Reilly-Diakun
(74) *Attorney, Agent, or Firm* — Antonelli, Terry, Stout & Kraus, LLP.

(57) ABSTRACT

A projection type image display apparatus in which shortening of the projection distance (widening of the angle of view) and miniaturization of the projection optic system are realized is provided. It comprises, in a traveling direction of the light, an image display element, a lens group including a plurality of lenses, a first lens, a second lens, and a mirror to reflect light emitted from the second lens to be projected obliquely on a screen in this order. The refractive power of the first lens is positive and the refractive power of the second lens is negative. The first and the second lenses are moved in an interlocked relationship with each other along an optical axis of the lens group and a movement amount of the first lens is made larger than a movement amount of the second lens.

4 Claims, 11 Drawing Sheets

(56) References Cited

U.S. PATENT DOCUMENTS

| | | | |
|---|---|---|---|
| 8,020,999 B2 * | 9/2011 | Hirata et al. | 353/70 |
| 8,113,667 B2 * | 2/2012 | Yamada et al. | 353/99 |
| 8,182,097 B2 * | 5/2012 | Hirata et al. | 353/70 |
| 8,279,527 B2 * | 10/2012 | Lin | 359/649 |
| 2004/0196568 A1 * | 10/2004 | Matsuo | 359/649 |
| 2006/0227432 A1 * | 10/2006 | Yoshikawa et al. | 359/726 |
| 2009/0059185 A1 * | 3/2009 | Hisada et al. | 353/98 |
| 2009/0115975 A1 * | 5/2009 | Ogura | 353/98 |
| 2010/0097581 A1 * | 4/2010 | Yamada et al. | 353/70 |
| 2010/0290010 A1 * | 11/2010 | Hirata et al. | 353/37 |

* cited by examiner

OBLIQUE PROJECTOR HAVING MOVABLE FREE FORM LENSES

INCORPORATION BY REFERENCE

The present application claims priority from Japanese application JP2010-126436 filed on Jun. 2, 2010, the content of which is hereby incorporated by reference into this application.

BACKGROUND OF THE INVENTION

The present invention relates to a projection type image display apparatus.

In a prior art, a projection optic system (FIG. 8) using one free-form-surface mirror and two free-form-surface lenses and technique (FIG. 9) in which the two free-form-surface lenses thereof are moved in an interlocked relationship with each other for focusing are known (refer to JP-A-2010-72374 and JP-A-2009-109867).

FIG. 10A is a schematic diagram which extracts free-form-surface lenses functioning as focusing lenses and a fixed lens disposed before the lenses and FIG. 10B is a schematic diagram illustrating movement loci of the free-form-surface lenses functioning as focusing lenses, that is, a cam diagram. In FIGS. 10A and 10B, the smaller an image projected onto a screen is, the more the focusing lenses are moved to an image plane side. Further, a movement amount of the focusing lens on the image plane side is larger than a movement amount of the focusing lens on an image display element side.

SUMMARY OF THE INVENTION

According to the prior art, in the projection optic system using the focusing lenses, a large projection image is obtained with a short projection distance (a distance from the object plane (image display element surface) to the principal point of the free-form-surface mirror 23 is 327.6 mm, a distance from the principal point of the free-form-surface mirror 23 to the image plane is 567 mm, and the image is 80 inches). However, further shortening of the projection distance and miniaturization of the projection optic system are required.

Accordingly, it is an object of the present invention to provide a projection type image display apparatus in which shortening of the projection distance (widening of the angle of view) and miniaturization of the projection optic system are realized.

In order to achieve the above object, a desirable aspect of the present invention is as follows.

A projection type image display apparatus comprises a lens group disposed in a traveling direction of the light with respect to an image display element and including a plurality of lenses, a first lens disposed in the traveling direction of the light with respect to the lens group, a second lens disposed in the traveling direction of the light with respect to the first lens, and a mirror to reflect the light emitted from the second lens to be projected obliquely on a screen. The refractive power of the first lens is positive and the refractive power of the second lens is negative. The first and the second lenses are moved in an interlocked relationship with each other along an optical axis of the lens group and a movement amount of the first lens is made larger than a movement amount of the second lens.

Other objects, features and advantages of the invention will become apparent from the following description of the embodiments of the invention taken in conjunction with the accompanying drawings.

DESCRIPTION OF THE EMBODIMENTS

Embodiments of the present invention are now described with reference to the accompanying drawings.

Figure 4A:
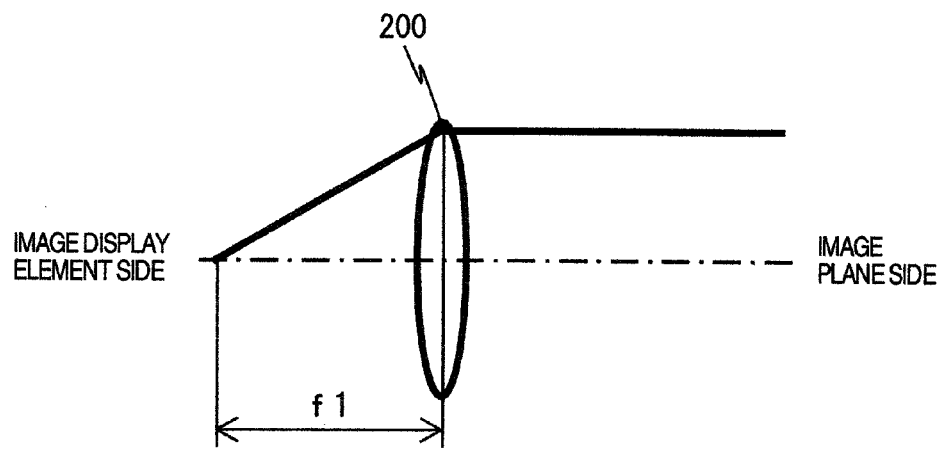
FIGS. 4A and 4B are diagrams illustrating a basic operation of a wide-conversion lens.
Figure 4B:
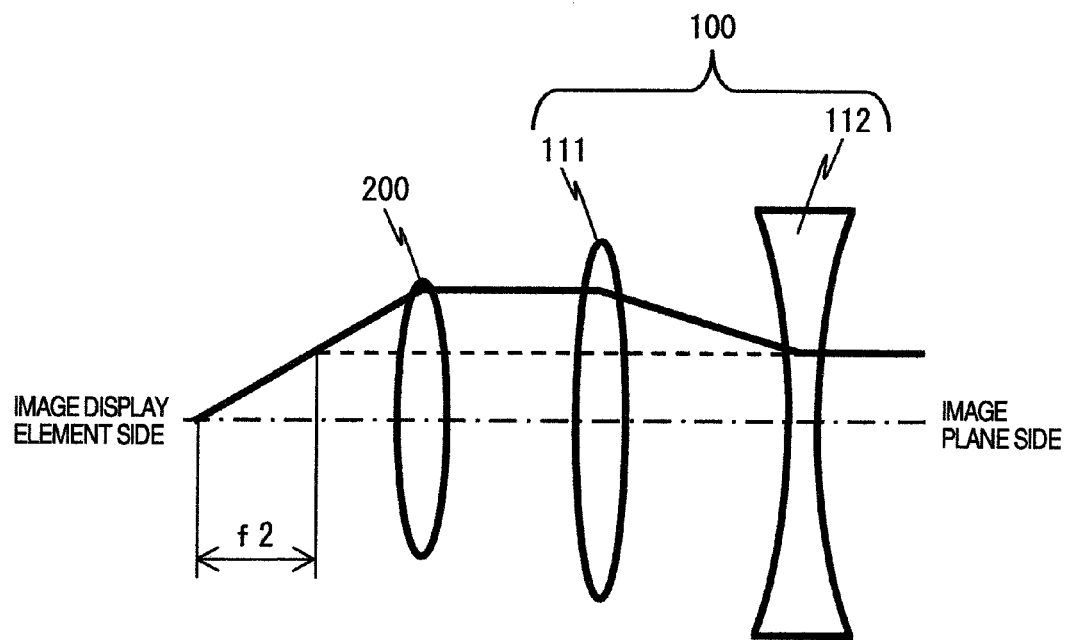

First, referring to FIGS. 4A and 4B, a basic composition and the effect of angle-of-view widening of a wide-conversion lens are described. FIG. 4A illustrates a focal distance f1 of a primary lens 200 in case where there is no wide-conversion lens 100. A luminous flux from infinity is focused on a focal point of the primary lens 200. On the other hand, FIG. 4B is a schematic diagram illustrating a composition in which a wide-conversion lens 100 is disposed on the image plane side of the primary lens 200. A luminous flux from infinity is pushed up by a concave lens 112 of the wide-conversion lens 100 and returned to a collimated luminous flux by a convex lens 111 to be focused on the focal point of the primary lens 200. Actually, the primary lens 200 is designed to have a predetermined F-number and, when observed from the image display element side, a collimated light to enter the primary lens 200 is bent by the convex lens 111 and returned to a collimated luminous flux by the concave lens 112.

Here, the collimated luminous flux entering the lens is focused on the focal point of the lens. That is, a distance from the principal point of the concave lens 112 to the focal point of the collimated luminous flux is the focal distance and, accordingly, it is understood that focal distance becomes as small as f2 by arranging the wide-conversion lens 100. This is the effect of angle-of-view widening by the wide-conversion lens 100.

Accordingly, it can be forecasted that providing the function of angle-of-view widening of a wide-conversion lens in a plurality of free-form-surface lenses will be advantageous in further widening of the angle of view. Incidentally, a free-form surface represents a rotationally asymmetric, curved surface, for example.

Next, a movement amount of a focusing lens upon a focusing operation when a negative refractive power is provided in a free-form-surface lens on the image plane side is explained.

With regard to a feed amount δ of a focusing lens in case where focusing operation is performed by a front lens (a lens disposed at the nearest to the image plane side), when a projection distance L and a focal distance f of the front lens are used, the following image formation equation is given.

$$1/(f+\delta)+1/L=1/f \quad (1)$$

The equation (1) is solved for the feed amount δ to obtain the following equation (2).

$$\delta = f^2/(L-f) \quad (2)$$

Figure 5:
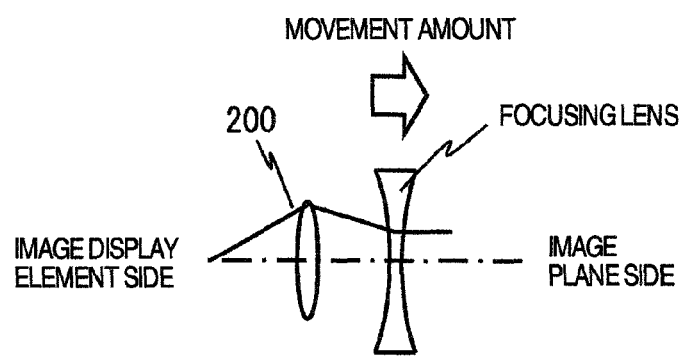
FIG. 5 is a diagram illustrating a movement amount of a focusing lens in a front lens focusing system using a concave lens.
Figure 5:
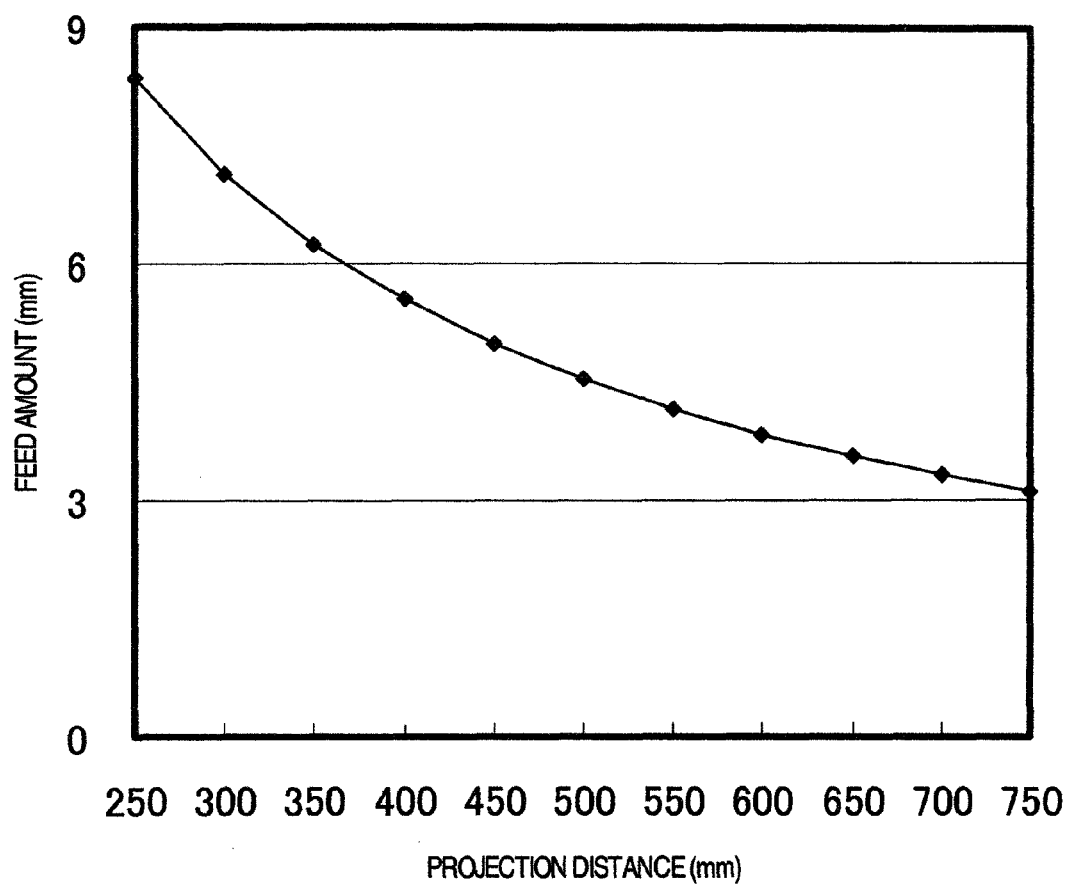

FIG. 5 shows a movement amount of a focusing lens in a front lens focusing system using a concave lens. The abscissa represents the projection distance and the ordinate represents the feed amount of the focusing lens. The focal distance of the focusing lens (the concave lens) is defined to be −50 mm, which is about ten times as large as 4.9 mm of the focal distance (a value calculated back from a relation between the object and the image) of the projection optic system 30 shown in FIG. 8. Further, the projection distance from the principal point of the free-form-surface mirror 13 to the screen is set to be in a projection distance range of 250 mm to 750 mm, which contains the projection distance of 567 mm at which the image size is 80 inches in the projection optic system 30 of FIG. 8. As a result of calculation, the feed amount at the projection distance of 750 mm is 3.13 mm, the feed amount at the projection distance of 250 mm is 8.33 mm, and the movement amount of the focusing lens is 5.21 mm.

Next, a movement amount of a focusing lens when a concave lens and a convex lens are disposed in order of description from the image plane side and the convex lens takes charge of the focusing operation is explained with reference to FIGS. 6 and 7.

Figure 6:
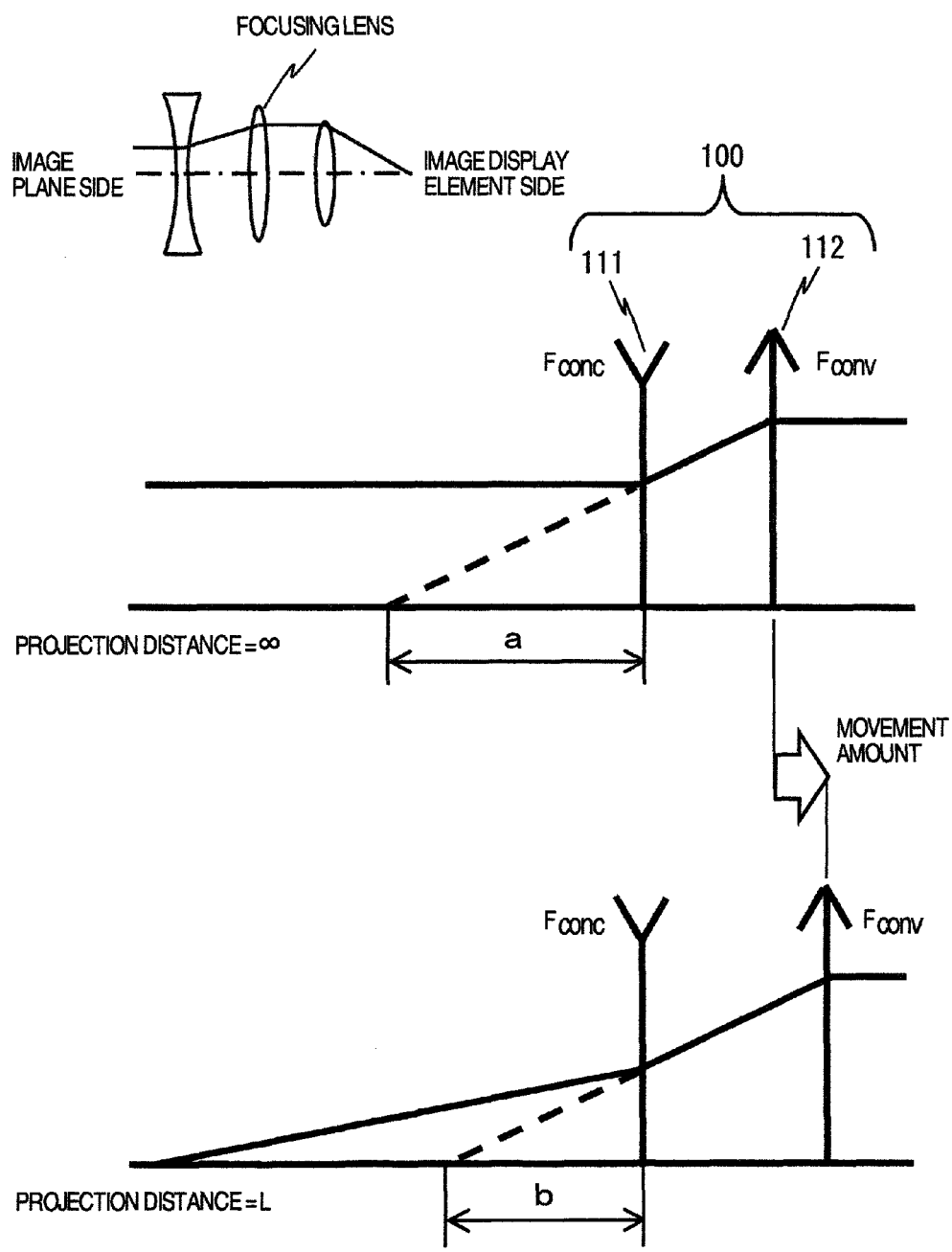
FIG. 6 is a diagram illustrating a movement of a focusing lens in an inner focusing system using a convex lens.

In FIG. 6, a concave lens 111 and a convex lens 112 are disposed from the image plane side to form a wide-conversion lens 100. A collimated luminous flux from the image plane side is pushed up by the concave lens 111 and is returned to a collimated luminous flux by the convex lens 112 again. The focal distance $f_{conc}$ of the concave lens 111 is—a and a sum obtained by adding the distance between the concave lens 111 and the convex lens 112 to the focal distance $f_{conc}$ of a is the focal distance $f_{conv}$ of the convex lens 112. When the projection distance is changed from infinity to L, Equation (3) is obtained from the image formation equation for the image of the object existing at the projection distance L.

$$1/b+1/L=1/f \quad (3)$$

Equation (3) is solved for the image position b to obtain Equation (4).

$$b=1/(1/f_{conc}-1/L) \quad (4)$$

The difference between b and a is the movement amount of the image position mapped by the concave lens 111. By moving the convex lens 112 by the same amount as this movement amount, the luminous flux refracted by the convex lens 112 is returned to a collimated luminous flux again. That is, the movement amount δ of the convex lens 112 is determined by Equation (5).

$$\delta = b - f_{conc} = 1/(1/f_{conc}-1/L) - f_{conc} \quad (5)$$

Figure 7:
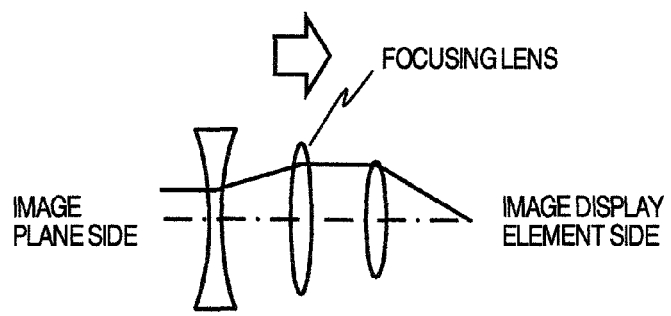
FIG. 7 is a diagram illustrating a movement amount of the focusing lens in the inner focusing system using the convex lens.
Figure 7:
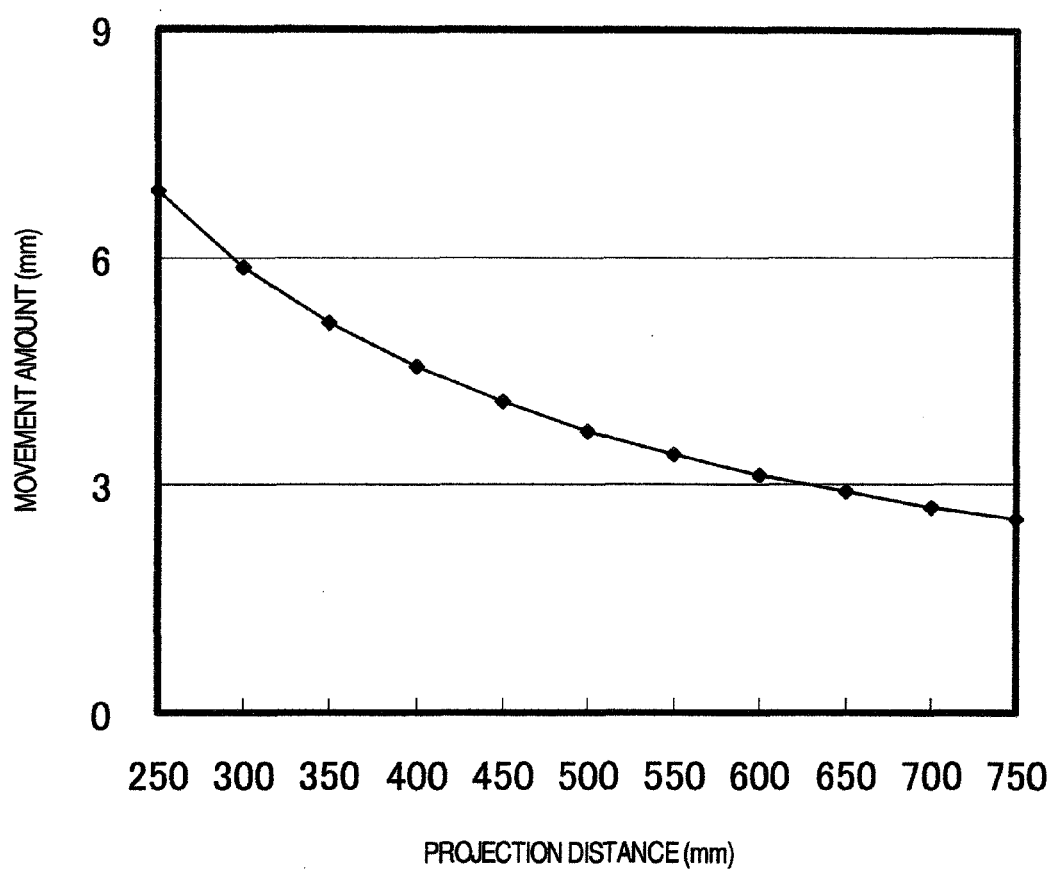

FIG. 7 shows a movement amount of the focusing lens in the inner focusing system using the convex lens. Similarly to FIG. 5, the abscissa represents the projection distance, the ordinate represents the feed amount of the focusing lens, and the focal distance of the focusing lens (the convex lens) is defined to be 50 mm. On the other hand, the focal distance of the concave lens is defined to be −45 mm (the distance between the concave lens and the convex lens is 5 mm). Further, the projection distance from the free-form-surface mirror 13 to the screen is set in a projection distance range of 250 mm to 750 mm, similarly to FIG. 5. As a result of calculation, the feed amount at the projection distance 750 mm is 2.55 mm, the feed amount at the projection distance 250 mm is 6.86 mm, and the movement amount of the focusing lens is 4.32 mm.

In other words, it is understood that in comparison with the same absolute value of the refractive power of a focusing lens, when a convex lens positioned on the image display element side of the wide-conversion lens composed of a concave lens and a convex lens is used as a focusing lens, the movement amount of the focusing lens can be made small.

As described above, by using a convex lens of a wide-conversion lens composed of a concave lens and a convex lens from the image plane side as a primary focusing lens, a focusing operation having a suppressed movement amount of the focusing lens can be realized in addition to the effect of angle-of-view widening by the wide-conversion lens.

Concrete lens configuration is now described hereinafter.

Figure 1:
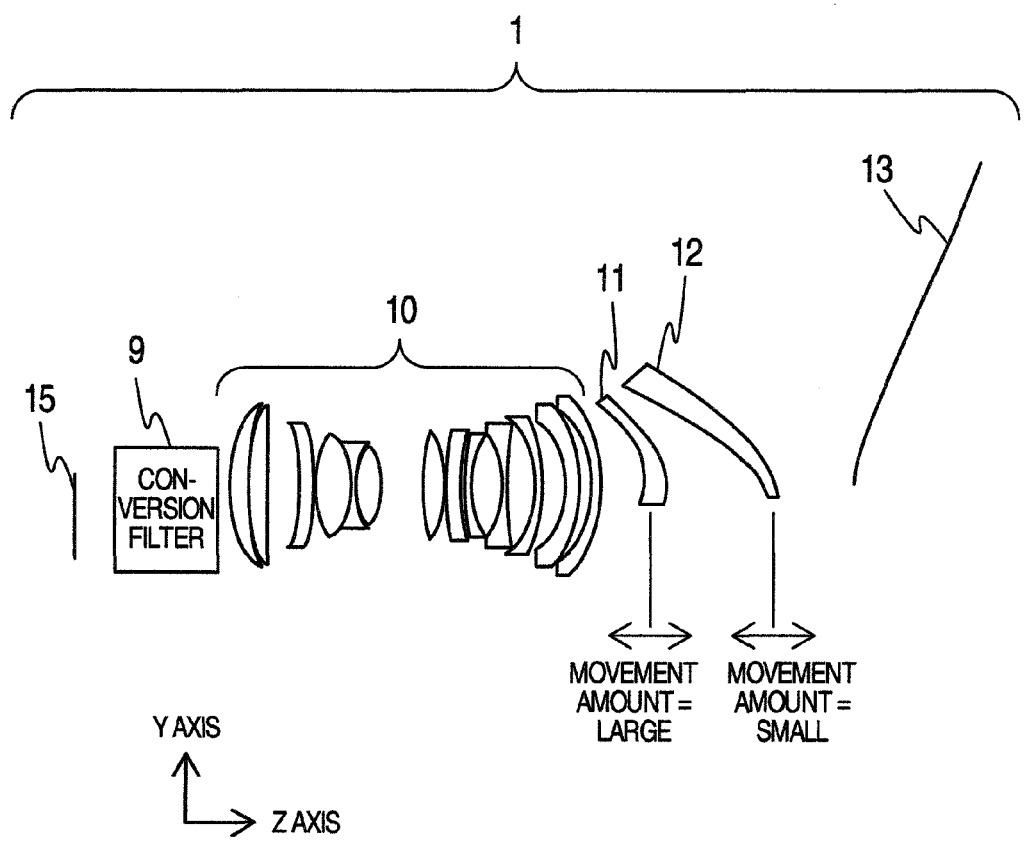
FIG. 1 is a schematic diagram illustrating a projection optic system of an embodiment.

FIG. 1 is a schematic diagram illustrating a projection optic system 1. In the projection optic system 1, an image display element 15, a conversion filter 9, a coaxial lens group 10 having a refraction function and including a plurality of lenses, a first free-form-surface lens 11 having a positive refractive power, a second free-form-surface lens 12 having a negative refractive power, and a free-form-surface mirror 13 are arranged in the traveling direction of the light in order of description.

Here, the refractive power of a free-form-surface lens is defined to be positive when the distance over which a principal ray far from the optical axis of the lens group 10 passes through the free-form-surface lens is shorter than the distance over which a principal ray near the aforementioned optical axis passes (that is, the lens thickness is less at a part far from the optical axis than that near the optical axis); conversely, it is defined to be negative when the distance over which a principal ray far from the optical axis of the lens group 10 passes through the free-form-surface lens is longer than the distance over which a principal ray near the aforementioned optical axis passes (that is, the lens thickness is greater at a part far from the optical axis than that near the optical axis). Besides, when a ray falls on the optical axis of the lens group 10, the passing distance is equal to the thickness at the center of the lens. The first and the second free-form-surface lenses 11 and 12 are moved on the optical axis in an interlocked relationship with each other and a movement amount of the first free-form-surface lens 11 is made larger than a movement amount of the second free-form-surface lens 12.

Figure 2:
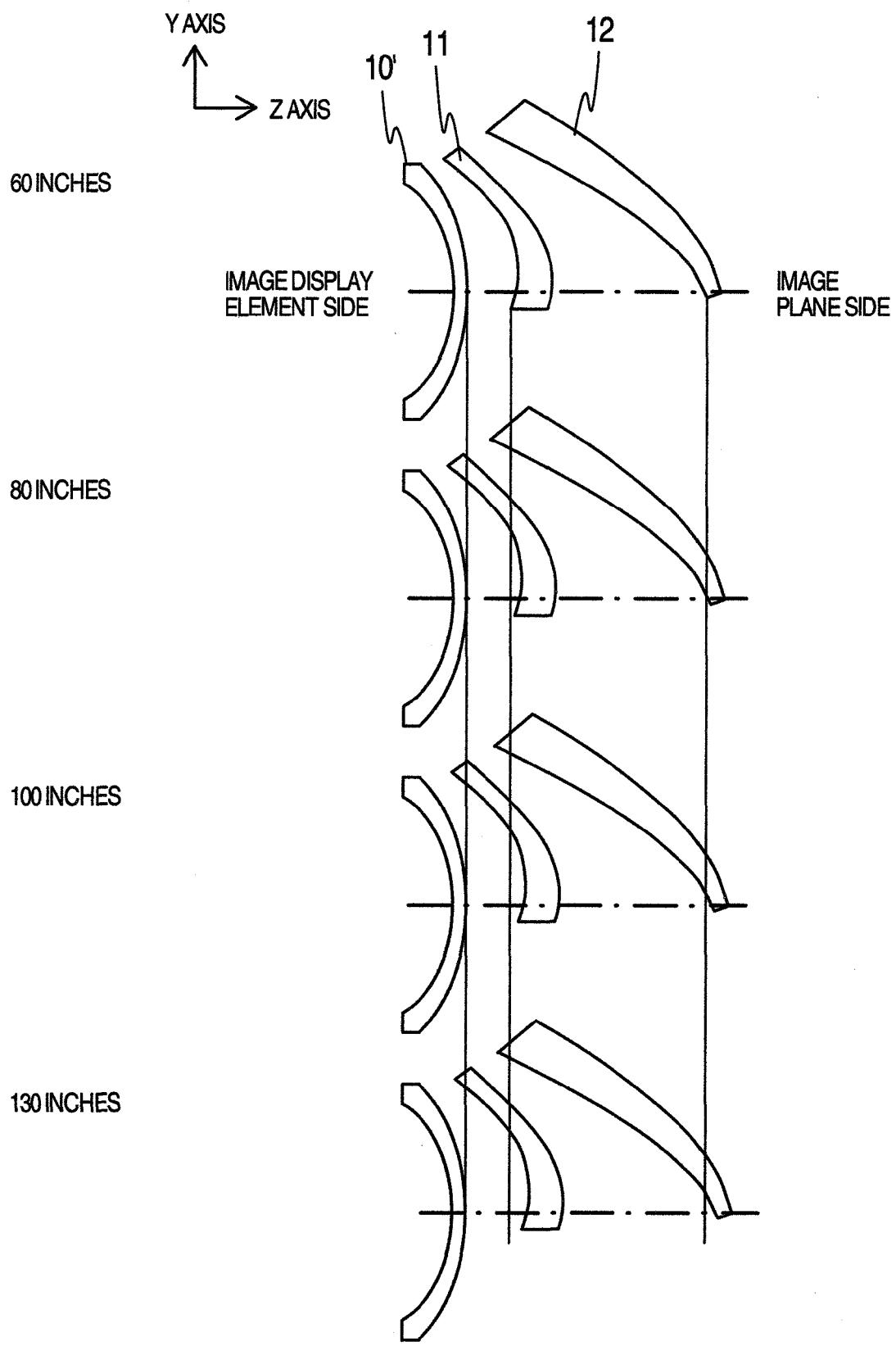
FIG. 2 is a diagram illustrating movement positions of focusing lenses for each projection size in the embodiment.

FIG. 2 shows movement positions of the focusing lenses for each projection size. In the figure, the states that the first and the second free-form-surface lenses 11 and 12 which are focusing lenses are moved with respect to the lens 10' of a part of the coaxial lens group having a refraction function are shown. It is understood that the first and the second free-form-surface lenses 11 and 12 are moved to the image display element side as the projection size changes from 130 inches to 60 inches and the movement amount of the first free-form-surface lens 11 is larger than that of the second free-form-surface lens 12.

Figure 3A:
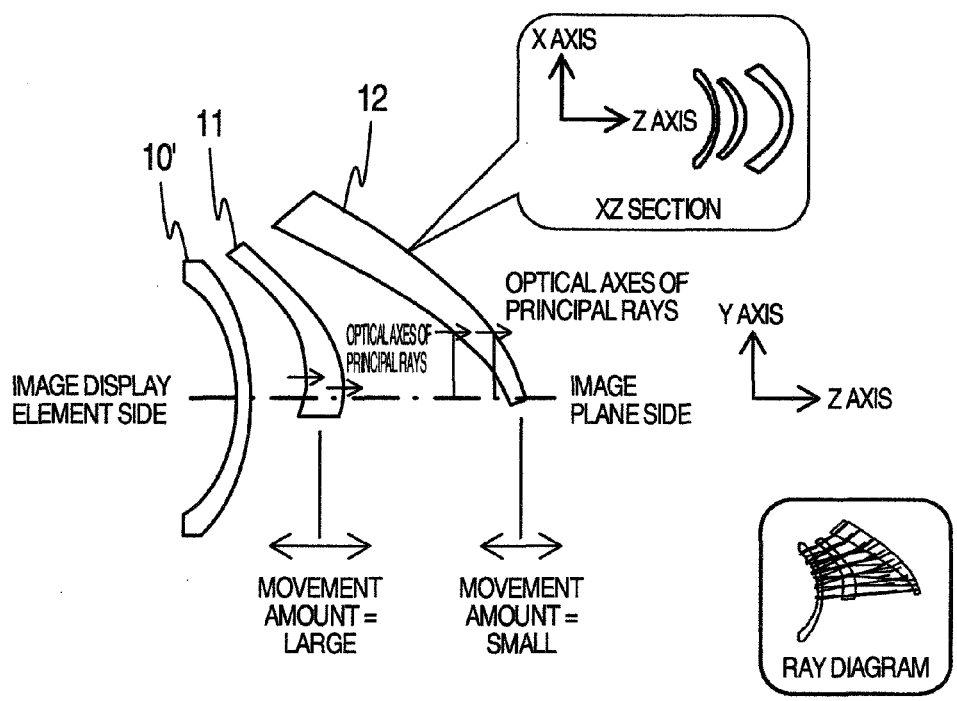
FIGS. 3A and 3B are schematic diagrams illustrating the focusing lenses and their movements thereof in the embodiment.
Figure 3B:
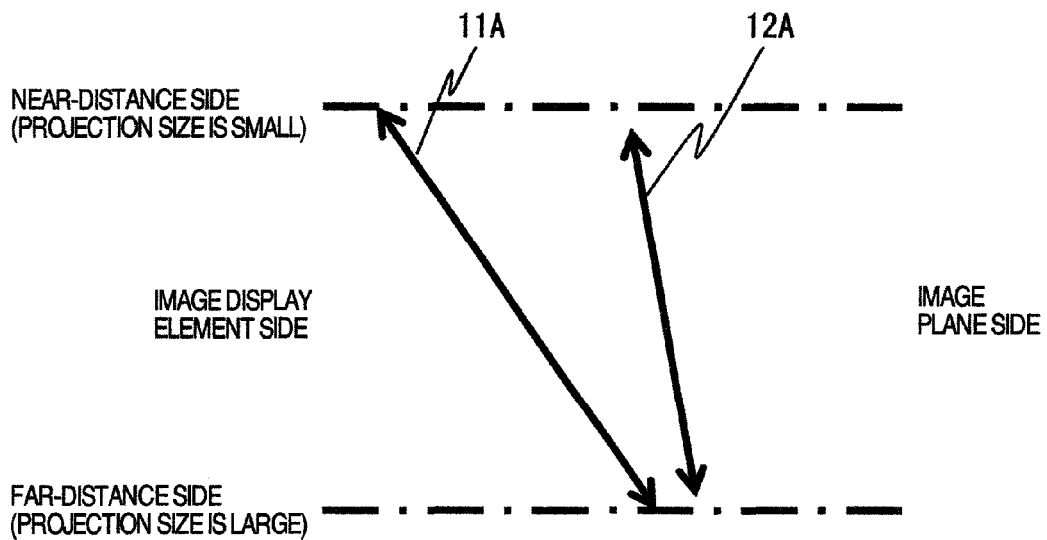

FIGS. 3A and 3B schematically illustrate the focusing lenses and their movements thereof. In the first free-form-surface lens 11 on the image display element side, a lens thickness at a part far from the optical axis of the lens group 10 shown in FIG. 3A is less than that near the aforementioned optical axis; that is, the lens is a free-form-surface lens of a positive refractive power. Further, from the sectional view of the lens at the XZ section shown in addition to the section of the lens at the YZ section both sections of YZ and XZ show shapes of positive refractive powers. Similarly, in the second free-form-surface lens 12 on the image plane side, a lens thickness at a part far from the optical axis of the lens group 10 is greater than that near the aforementioned optical axis; that is, the lens is a free-form-surface lens of a negative refractive power. Both sections of YZ and XZ show shapes of negative refractive powers.

Table 1 represents passing distances of principal rays in the free-form-surface lenses when principal rays of each angle of view pass through each of free-form-surface lenses. It is understood that the first free-form-surface lens has a positive refractive power and the second free-form-surface lens has a negative refractive power. Moreover, in FIG. 11, there are provided a total of 8 object points and rays from the object points are shown.

TABLE 1

Figure 11:
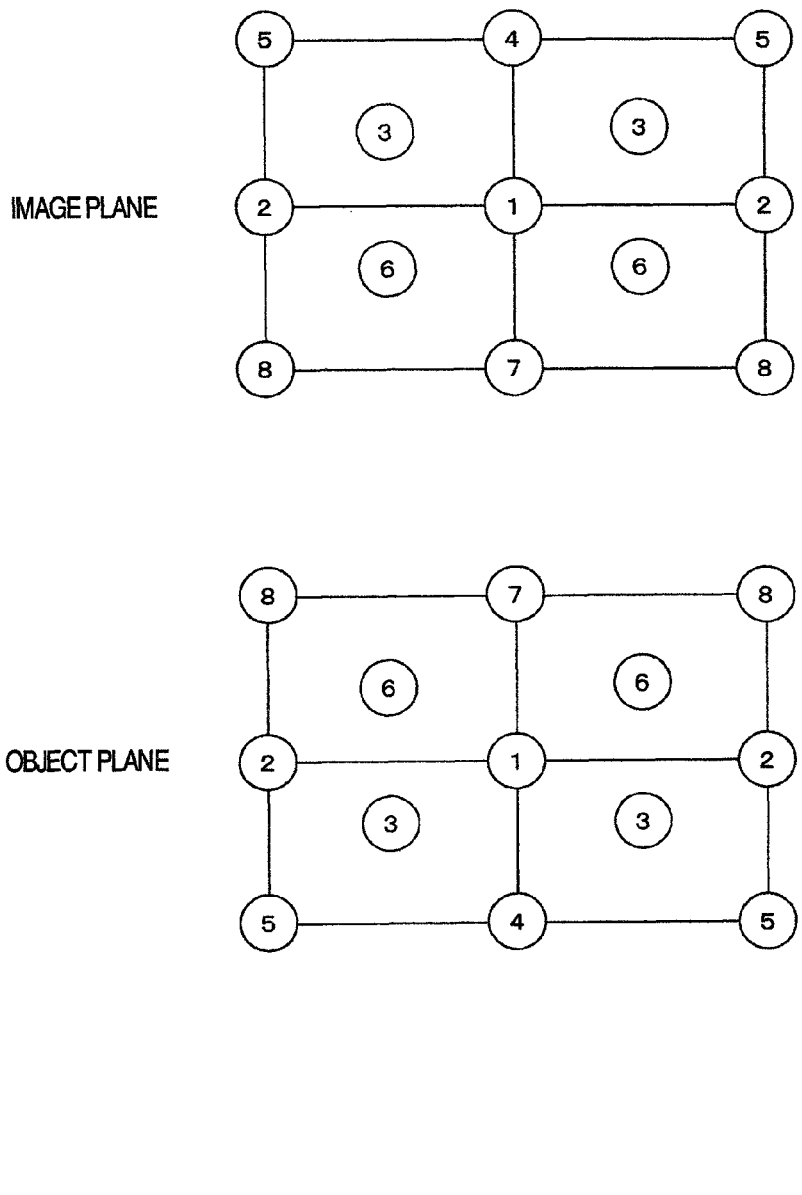
FIG. 11 is a diagram illustrating an arrangement of object points (image points) for conditions of ray tracing.

| object points | the first free-form-surface lens | the second free-form-surface lens | object point closest to the condition among the object points of the bilateral symmetry in FIG. 11 |
|---|---|---|---|
| ① | 3.8 mm | 6.2 mm | |
| ② | 3.1 mm | 7.1 mm | |
| ③ | 3.0 mm | 7.4 mm | |
| ④ | 2.7 mm | 7.7 mm | object point far from the optical axis of the coaxial lens system in the YZ section |
| ⑤ | 2.9 mm | 7.6 mm | |
| ⑥ | 4.4 mm | 5.3 mm | |
| ⑦ | 5.5 mm | 2.6 mm | object point near the optical axis of the coaxial lens system |
| ⑧ | 3.9 mm | 6.0 mm | object point far from the optical axis of the coaxial lens system in the XZ section |

Figure 8:
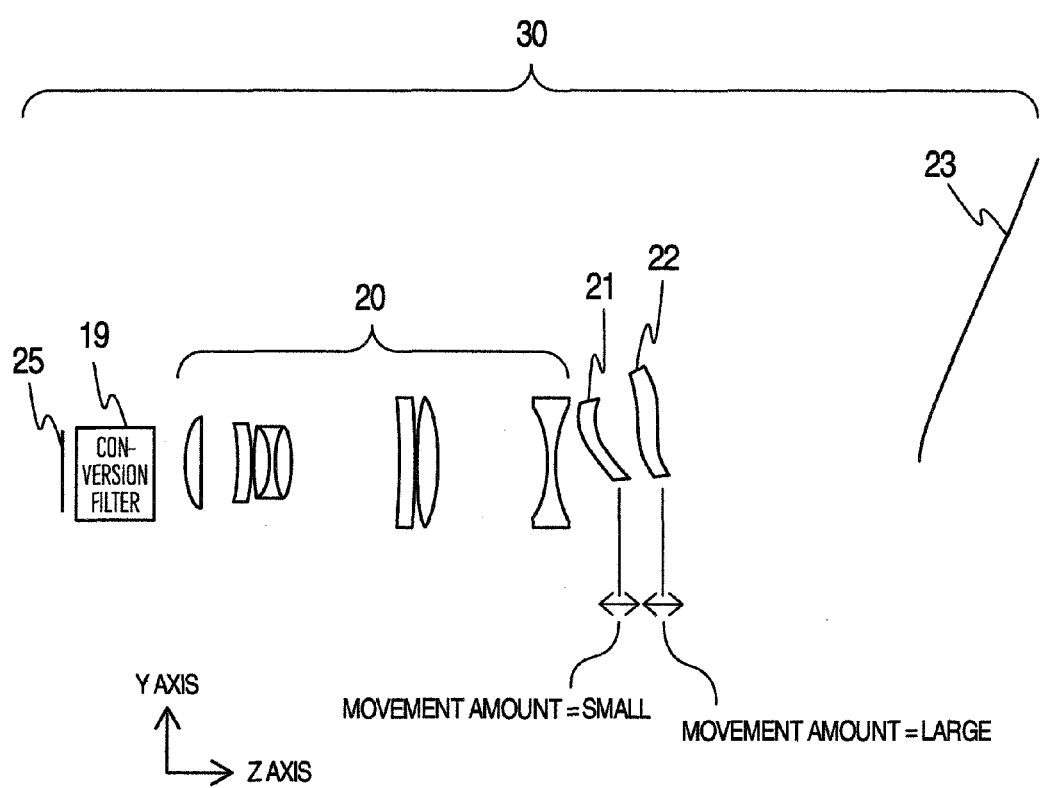
FIG. 8 is a diagram illustrating the whole of a projection optic system of a prior art.
Figure 9:
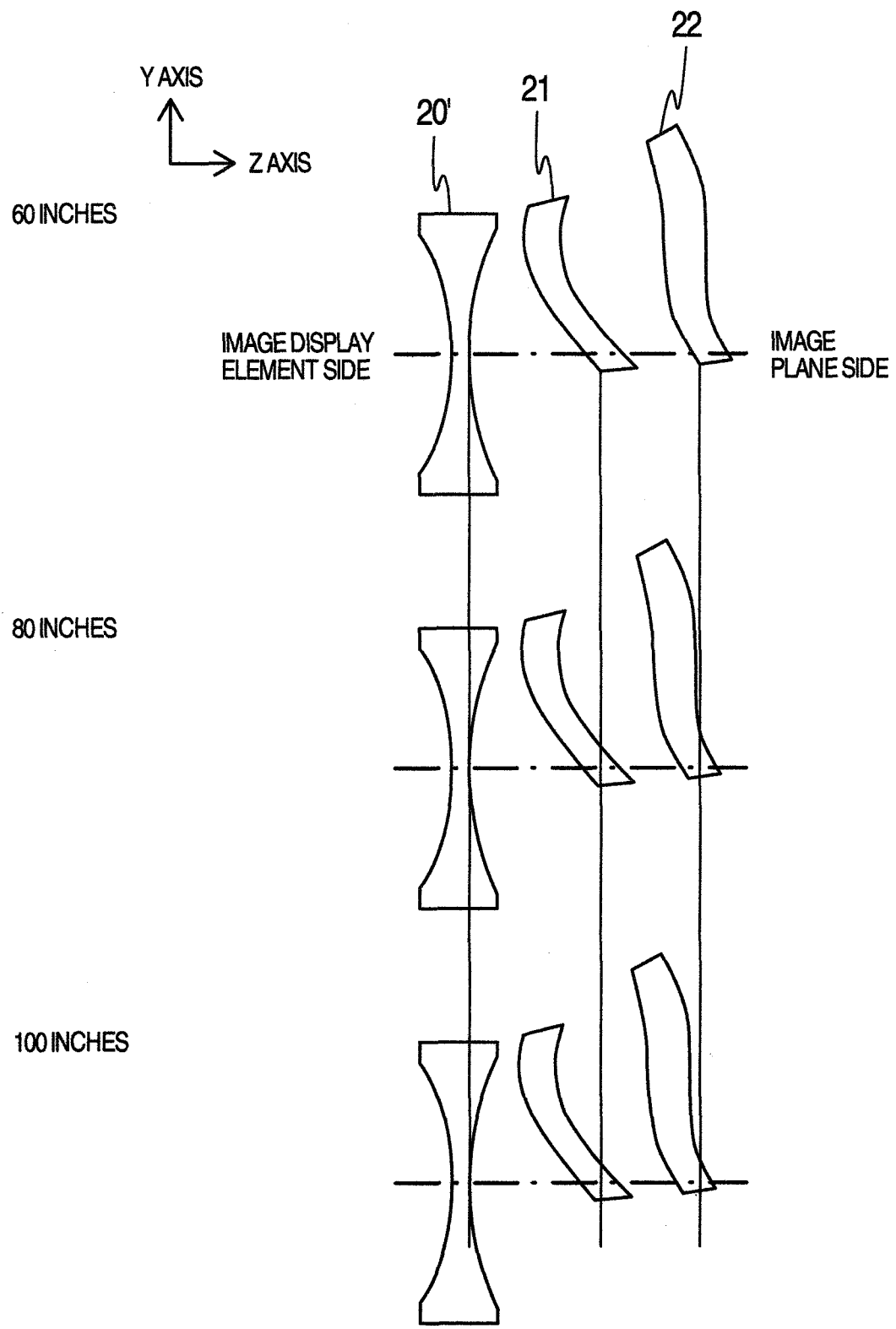
FIG. 9 is a diagram illustrating movement positions of the focusing lenses for each projection size in the prior art.
Figure 10A:
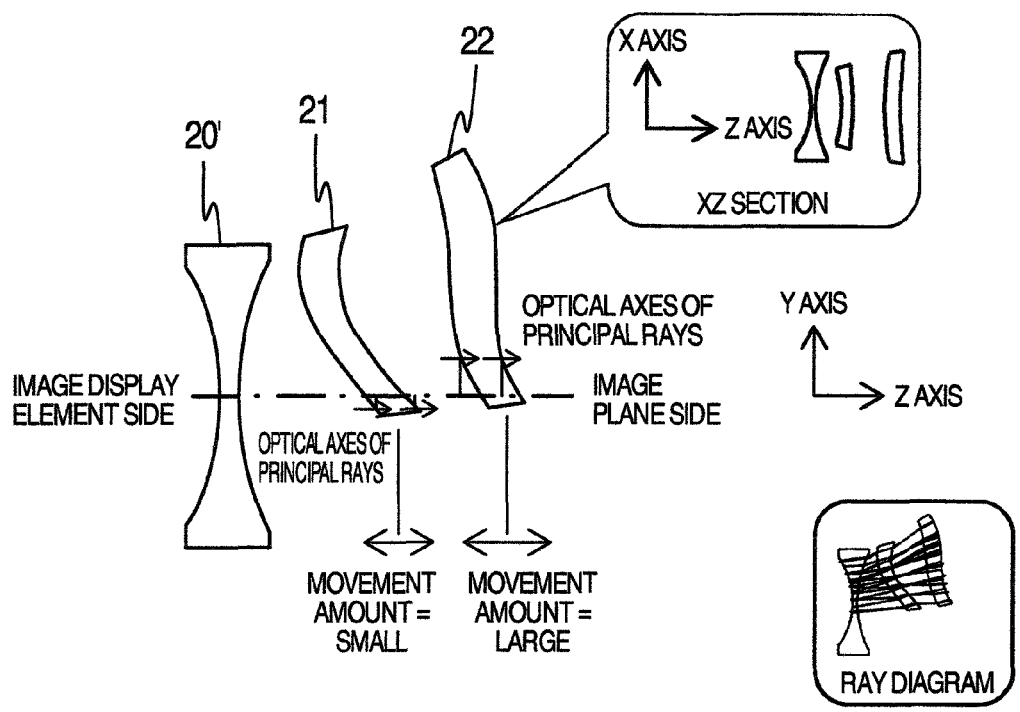
FIGS. 10A and 10B are schematic diagrams illustrating the focusing lenses and their movements thereof in the prior art.
Figure 10B:
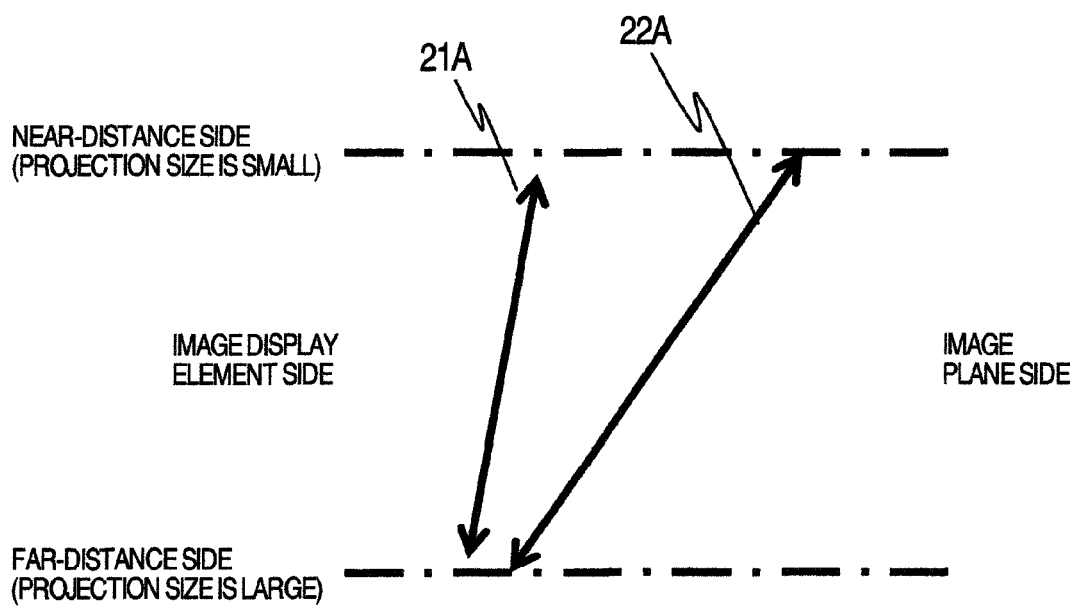

On the other hand, for comparison, Table 2 represents passing distances of principal rays in lenses which pass through each of free-form-surface lenses in a conventional projection optic system shown in FIG. 8. It is understood that the first free-form-surface lens has a negative refractive power and the second free-form-surface lens has a negative refractive power in the conventional projection optic system.

TABLE 2

| object points | the first free-form-surface lens | the second free-form-surface lens | object point closest to the condition among the object points of the bilateral symmetry in FIG. 11 |
|---|---|---|---|
| ① | 4.8 mm | 6.5 mm | |
| ② | 5.3 mm | 6.7 mm | |
| ③ | 5.3 mm | 6.9 mm | |
| ④ | 5.9 mm | 6.8 mm | object point far from the optical axis of the coaxial lens system in the YZ section |
| ⑤ | 6.5 mm | 6.3 mm | |
| ⑥ | 4.8 mm | 6.1 mm | |
| ⑦ | 4.8 mm | 5.7 mm | object point near the optical axis of the coaxial lens system |
| ⑧ | 5.3 mm | 6.1 mm | object point far from the optical axis of the coaxial lens system in the XZ section |

Incidentally, in the present embodiment, the first and the second free-form-surface lenses 11 and 12 and the free-form-surface mirror are used for explanation; they are not limited to free-form and they may be, for example, aspheric lenses or mirrors instead of free-form. However, when a projection optic system is disposed obliquely to the screen, rotational asymmetrical error amounts (trapezoid distortion, different focused positions in places, and the like) occur. In order to correct the error amounts, it is effective that free-form, particularly, rotational asymmetrical optical elements (lens, mirror, and the like) are used.

According to the present invention, there can be provided a projection type image display apparatus which implements further shortening of the projection distance (angle-of-view widening) and miniaturization of the projection optic system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type image display apparatus comprising:
a lens group disposed in a traveling direction of a light with respect to an image display element and including a plurality of lenses;
a first lens disposed in the traveling direction of the light with respect to the lens group;
a second lens disposed in the traveling direction of the light with respect to the first lens; and
a mirror to reflect the light emitted from the second lens to be projected obliquely on a screen; in which
a refractive power of the first lens is positive and a refractive power of the second lens is negative; and
the first and the second lenses being moved in an interlocked relationship with each other along an optical axis of the lens group and a movement amount of the first lens is made larger than a movement amount of the second lens.

2. The projection type image display apparatus according to claim 1, wherein
the first and the second lenses are free-form-surface lenses and
the mirror is a free-form-surface mirror.

3. The projection type image display apparatus according to claim 2, wherein
the first and the second lenses are moved, respectively, toward the image display element side as a projection distance from a principal point of the mirror to the screen is changed from large to small.

4. The projection type image display apparatus according to claim 1, wherein
the first and the second lenses are moved, respectively, toward the image display element side as a projection distance from a principal point of the mirror to the screen is changed from large to small.

* * * * *